United States Patent
Adler et al.

(10) Patent No.: US 9,593,752 B2
(45) Date of Patent: Mar. 14, 2017

(54) BALL SCREW

(71) Applicant: Schaeffler Technologies AG & Co. KG, Herzogenaurach (DE)

(72) Inventors: Dieter Adler, Herzogenaurach (DE); Stefanie Oeder, Baudenbach (DE); Sigurd Wilhelm, Herzogenaurach (DE); Bernhard Wiesneth, Erlangen (DE); Nicky Heinrich, Neustadt a.d. Aisch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/761,816

(22) PCT Filed: Nov. 29, 2013

(86) PCT No.: PCT/DE2013/200329
§ 371 (c)(1),
(2) Date: Jul. 17, 2015

(87) PCT Pub. No.: WO2014/121768
PCT Pub. Date: Aug. 14, 2014

(65) Prior Publication Data
US 2015/0362051 A1    Dec. 17, 2015

(30) Foreign Application Priority Data

Feb. 8, 2013   (DE) .................... 10 2013 002 124
Apr. 5, 2013   (DE) .................... 10 2013 206 080

(51) Int. Cl.
*F16H 1/24*     (2006.01)
*F16H 55/02*    (2006.01)
*F16H 25/22*    (2006.01)
*F16D 65/18*    (2006.01)
(Continued)

(52) U.S. Cl.
CPC ......... *F16H 25/2233* (2013.01); *F16D 65/18* (2013.01); *F16D 2121/18* (2013.01); *F16D 2125/40* (2013.01); *Y10T 74/19744* (2015.01)

(58) Field of Classification Search
CPC ......... F16D 2125/40; F16H 2025/2271; F16H 25/2209; F16H 2025/2068; F16H 25/2009; F16H 2025/2463; F16H 25/2233
See application file for complete search history.

(56) References Cited

U.S. PATENT DOCUMENTS

| 1,905,039 A | 4/1933 | McKellar |
| 8,616,348 B2 | 12/2013 | Winkler et al. |
| 2009/0283371 A1 | 11/2009 | Winkler et al. |

(Continued)

FOREIGN PATENT DOCUMENTS

| DE | 102008032819 | 2/2009 |
| DE | 102008062180 | 9/2009 |
| DE | 102009019793 | 10/2010 |

*Primary Examiner* — William Kelleher
*Assistant Examiner* — Jake Cook
(74) *Attorney, Agent, or Firm* — Volpe and Koenig, P.C.

(57) ABSTRACT

A ball screw (1) having a threaded nut (3) arranged on the threaded shaft (2) and a ball channel (4) wound about the longitudinal axis of the threaded shaft (2), and in which the balls (5) and at least one helical spring (6) are received. This helical spring (6) is supported on a molded part (7) which is inserted into a recess (8) of the threaded nut (3) and closes the recess (8).

6 Claims, 4 Drawing Sheets

(51) Int. Cl.
*F16D 125/40* (2012.01)
*F16D 121/18* (2012.01)

(56) References Cited

U.S. PATENT DOCUMENTS

2011/0120247 A1* 5/2011 Osterlaenger ....... F16H 25/2233
74/424.82
2012/0018262 A1 1/2012 Winkler

* cited by examiner

BALL SCREW

FIELD OF THE INVENTION

The invention relates to a ball screw comprising a threaded nut arranged on a threaded shaft and a ball channel that is wound about the longitudinal axis of the threaded shaft and in which the balls and at least one helical spring are received.

BACKGROUND

A ball screw converts rotational movement between a threaded shaft and a threaded nut into a translational displacement between the threaded shaft and threaded nut.

For some time, ball screws have also been used for vehicle brakes that can be actuated electromechanically. In DE 10 2008 062 180 A1, a combination vehicle brake with electromechanically actuated parking brake is described. The vehicle brake comprises, on one hand, a driving brake that can be actuated hydraulically and, on the other hand, a parking brake device that can be actuated electromechanically. The parking brake device comprises a brake housing in which a hydraulic operating pressure chamber is defined by a brake piston that can be charged with a hydraulic pressurized medium for performing braking procedures, so that the brake piston can be moved in the longitudinal direction of the brake piston for achieving a braking effect. The parking brake device acts by means of gearing on the brake piston, wherein the gearing converts the rotational movement of an electromechanical actuator into a translational movement and causes an actuation of the brake piston for performing a parking brake procedure and holds the brake piston in the actuated position. A part of the gearing is constructed as a ball screw and comprises a threaded shaft and a threaded nut that are in contact with each other via rolling bodies formed as balls.

The ball screw comprises the threaded nut and the threaded shaft that define, with their ball grooves, a helical ball channel that is wound about the longitudinal axis of the threaded shaft and in which balls are arranged in a row of balls. When the ball screw is actuated under loading, the balls roll in the ball channel. When the ball screw is actuated without loading, the balls slide. So that it is always possible for the balls to roll under loading or to slide in the event of non-loading actuation of the ball screw, compressible helical springs are provided that guarantee a rolling path for the balls to roll.

The helical springs are arranged in the threaded nut and two springs are supported with their outer end on the threaded nut. The compressed helical springs have the effect that the balls are displaced into a home position. For an unloaded ball screw, the balls can be displaced along the ball channel, because they merely slide and do not roll on the ball grooves of the threaded shaft and the threaded nut.

In the conventional ball screw, the threaded nut has, on its inner side, a recess for the helical spring, so that the helical spring is supported on a contact surface of the threaded nut. The recess must have a certain size so that the helical spring can be positioned straight and then come into contact with the contact surface. Due to the size of the recess, the helical spring is not enclosed by the internal thread of the threaded nut, so that under unfavorable operating conditions there is the risk of buckling. One example for such an operating state is a load in which the balls roll and there is simultaneously a large stroke (travel).

SUMMARY

The invention is based on the objective of providing a ball screw that prevents buckling of the end of the helical spring, without requiring larger structural changes to the ball screw.

To achieve this objective, according to the invention it is provided in a ball screw of the type named above that the helical spring is supported on a molded part that is inserted into a recess of the threaded nut and closes the recess.

The invention touches on the idea that by providing a molded part, buckling or deformation of the helical spring can be reliably prevented, without requiring additional, large structural changes. The molded part can be easily used in the conventional ball screw known from DE 10 2008 062 180 A1, wherein advantages with regard to the number of required variants are produced in terms of assembly and verification of the design.

The molded part provided in the ball screw according to the invention has the effect that the recess or the free space is closed, so that the helical spring cannot move in this area. For an inserted molded part, the helical spring cannot reach this free space. Because the molded part closes the recess in the threaded nut, it is ensured that the helical spring is guided by the threads of the threaded nut and threaded shaft. In addition, the molded part forms a support surface for the helical spring or an element inserted into the helical spring. In particular, undesired movement, that is, buckling or displacement of the spring in the axial direction is prevented.

In the ball screw according to the invention, it is especially preferred that the molded part is held with a positive fit in the recess by a threaded shoulder of the threaded shaft. The size and shape of the molded part are here selected so that, between the molded part and the threaded shoulder of the threaded shaft, a certain play is present that prevents jamming.

It also lies within the scope of the invention that the molded part has a section with an at least approximately equal but opposite construction with respect to the threaded profile of the threaded shaft. Accordingly, the convex bulging of the molded part is adapted to the corresponding concave bulging of the threaded profile of the threaded shaft.

Especially high reliability is produced in the ball screw according to the invention when the molded part has a radially projecting shoulder with a first surface pointing toward the threaded nut and a second, oppositely arranged surface pointing toward the threaded shaft. This projecting shoulder that extends essentially in the axial direction from the molded part prevents tipping or unscrewing of the molded part held between the threaded nut and the threaded shaft. The molded part is here loaded in the circumferential direction by the helical spring.

Advantageously, the projecting shoulder extending in the circumferential direction has a circular segment-like construction. The shape is here selected so that the shoulder can be inserted into a gap between the threaded nut and threaded shaft.

The molded part of the ball screw according to the invention can be produced by a non-cutting production process, advantageously by injection molding or die casting or by sintering. The molded part can be made from plastic material or alternatively from a steel or aluminum alloy.

As an alternative to the production by a non-cutting production process, the molded part of the ball screw according to the invention can also be produced by a cutting production process.

In addition, the invention relates to a vehicle brake with a parking brake device that can be actuated electromechanically with an electromechanical actuator that has gearing with a ball screw for actuating and fixing a brake piston. The vehicle brake according to the invention is distinguished in that it has a ball screw of the described type.

BRIEF DESCRIPTION OF THE DRAWINGS

An embodiment of the invention is shown in the drawing and is described in more detail below. Shown are.

DETAILED DESCRIPTION OF THE PREFERRED EMBODIMENTS

Figure 1:
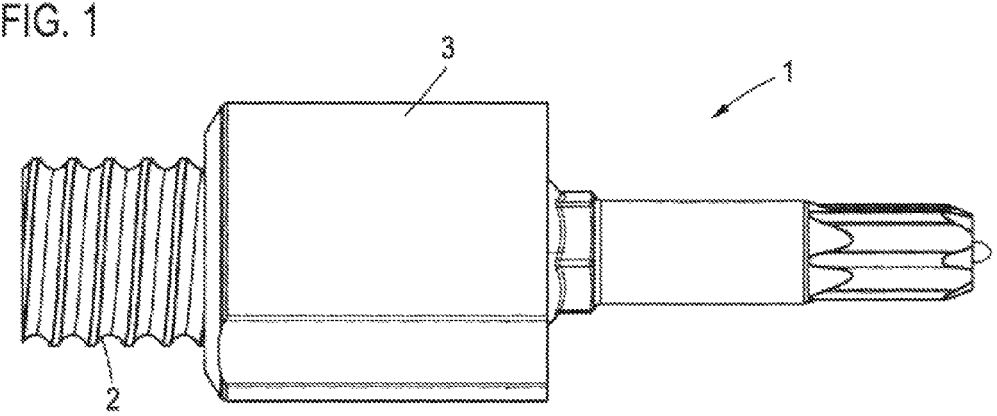
FIG. 1 a side view of a ball screw according to the invention.
Figure 2:
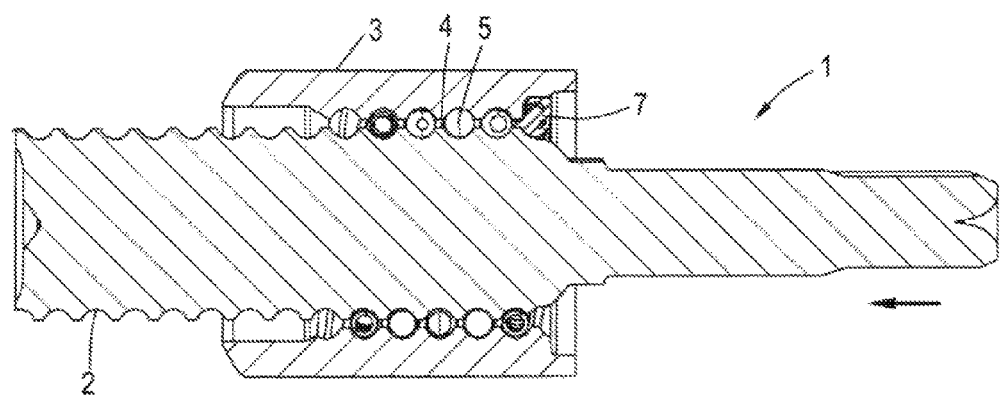
FIG. 2 a section view of the ball screw shown in FIG. 1 in an assembled position, FIG. 3 a view of the ball screw shown in FIG. 2 in the axial direction, FIG. 4 an enlarged view of the molded part, FIG. 5 an enlarged section view of the molded part in an assembled position, FIG. 6 a side view sectioned according to FIG. 2 of the ball screw according to the invention after assembly, FIG. 7 an axial view corresponding to FIG. 3 of the ball screw from FIG. 6, FIG. 8 an enlarged view corresponding to FIG. 4 of the molded part from FIG. 7, FIG. 9 an enlarged view corresponding to FIG. 5 of the molded part from FIG. 6 after assembly, FIG. 10 a perspective view of the molded part, and FIG. 11 another perspective view of the molded part.

The ball screw 1 shown in a side view in FIG. 1 and in a section view in FIG. 2 comprises a threaded nut 3 arranged on a threaded shaft 2 and a ball channel 4 wound about the longitudinal axis of the threaded shaft 2. In the section of the ball channel 4 that is located on the inner side of threaded nut 3 there are balls 5 and helical springs 6. The ball screw 1 is part of a parking brake that can be actuated electromechanically and is known from DE 10 2008 062 180 A1. A detailed explanation of the other components of the parking brake is therefore not provided here. In the sectioned side view of FIG. 2, it can be seen that the balls 5 are located in the ball channel 4. In addition, the helical spring 6 is provided that is located at one end of the ball channel 4.

Figure 3:
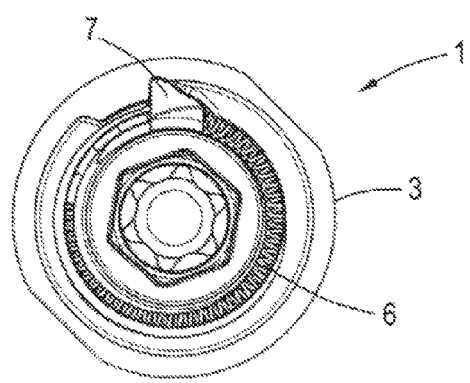
Figure 4:
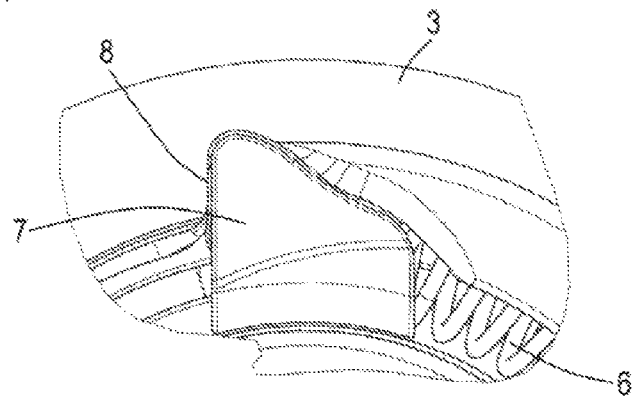

FIG. 3 is an axial view of the ball screw of FIG. 2 in the direction of the arrow shown there. It can be seen that one end of the helical spring 6 contacts a molded part 7 that is shown in FIG. 4 in an enlarged view. The molded part 7 is inserted into a recess 8 of the threaded nut 3. The molded part 7 closes the recess 8, so that the helical spring 6 contacts the molded part 7 and not the recess 8, as in other constructions. This prevents the end of the helical spring 6 from being able to buckle or deform in the ball channel 4.

Figure 5:
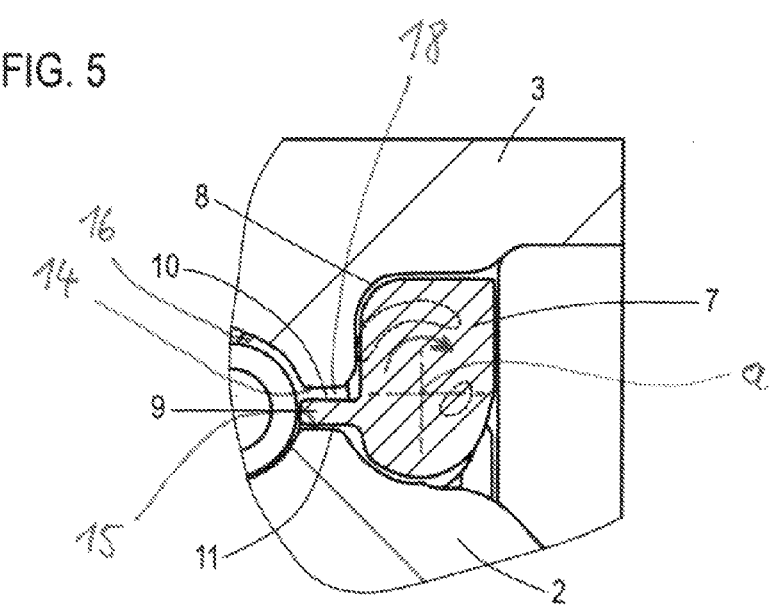

FIG. 5 shows the molded part 7 from FIG. 2 and FIG. 3 in an enlarged view. In FIG. 5, it can be seen that the molded part 7 has a projecting shoulder 9 that extends in the circumferential direction and is held in a ring gap between the threaded nut 3 and the threaded shaft 2. The shoulder 9 has a first surface 10 that points toward the threaded nut 3 and a second, opposite surface 11 that points toward the threaded shaft 2. The ring gap 18 is defined by the tooth tips 14, 15 of the helical ball grooves 16, 17 that are wound about the shaft axis and are formed on the threaded shaft 2 and on the threaded nut 3. The shoulder 9 curved in an arc shape about the shaft axis engages in this ring gap 18. This arc-shaped shoulder 9 here has a circular segment-like construction. The shoulder 9 prevents the molded part 7 from being able to be incorrectly tipped about a tipping axis a in the installed state.

Figure 6:
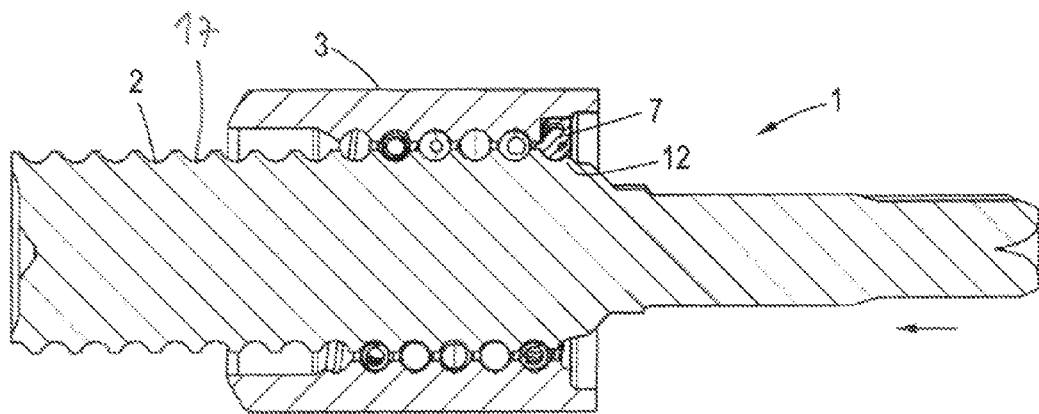
Figure 7:
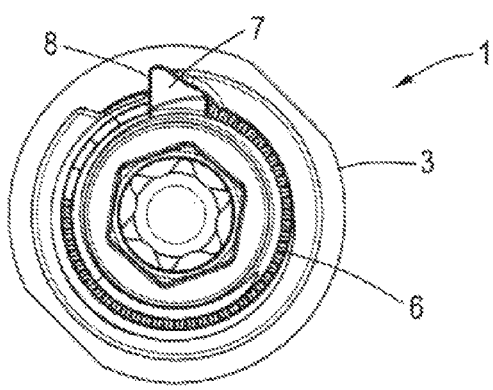
Figure 8:
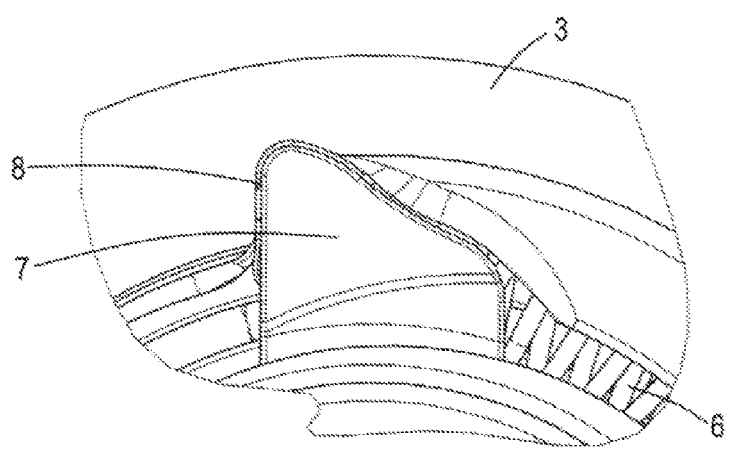
Figure 9:
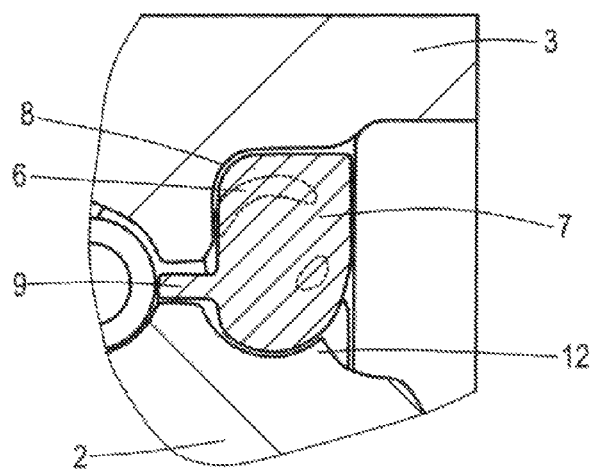

FIG. 2 shows the ball screw 1 in an assembled position. The threaded shaft 2 is rotated in the threaded nut 3 so that the molded part 7 can be inserted and installed in the axial direction. After assembly, the threaded shaft 2 is rotated back into an operating position that is shown in FIGS. 6-9. FIG. 6 here corresponds to FIG. 2 and shows a sectioned side view of the ball screw 1. FIG. 7 is an axial view of FIG. 6. FIG. 8 shows an enlarged detail in the area of the molded part. And FIG. 9 shows the molded part from FIG. 6 in an enlarged view.

In FIGS. 6 to 9, the threaded shaft 2 is located in its operating position. To reach this position, it was rotated back starting from the operating position shown in FIGS. 2 to 5. In FIGS. 6 and 9 it can be seen that the threaded shaft 2 has a threaded shoulder 12, so that the molded part 7 is held with a positive fit in the recess 8. The shoulder 9 of the molded part 7 is used as an additional safety device, because it prevents distortion or unscrewing of the molded part 7, but such a shoulder is optional, that is, the molded part 7 basically satisfies its function even if no such shoulder is provided.

Figure 10:
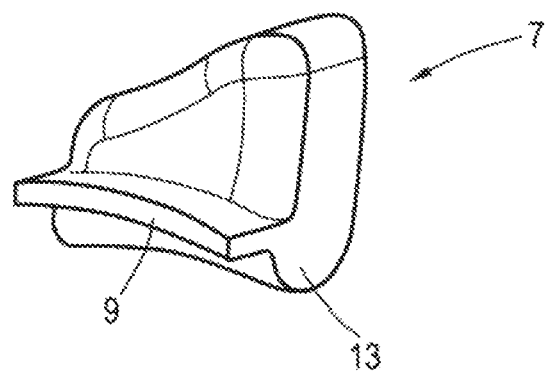
Figure 11:
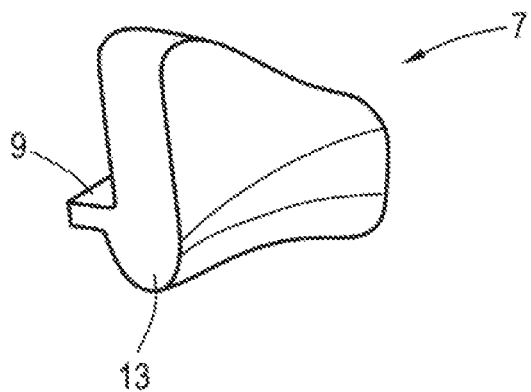

FIGS. 10 and 11 are perspective views of the molded part 7. It can be seen that the projecting shoulder 9 extending in the circumferential direction has a circular segment-like construction. The molded part 7 has a section 13 with an approximately equal but opposite construction with respect to the threaded profile (ball channel 4) of the threaded shaft 2. Accordingly, the molded part 7 is held in the assembled state by its section 13 with a positive fit in the profile of the threaded shaft 2. The other, opposite end of the molded part 7 is held with a positive fit in the recess 8 of the threaded nut.

LIST OF REFERENCE NUMBERS

1 Ball screw
2 Threaded shaft
3 Threaded nut
4 Ball channel
5 Balls
6 Helical spring
7 Molded part
8 Recess
9 Shoulder
10 First surface
11 Second surface
12 Threaded shoulder
13 Section
a Tipping axis

The invention claimed is:

1. A ball screw comprising a threaded nut arranged on a threaded shaft, the threaded shaft including threads that define a ball channel wound about a longitudinal axis of the threaded shaft, balls and at least one helical spring are received in the ball channel, a molded part that supports the helical spring is inserted into a recess of the threaded nut and closes the recess, the molded part is held with a positive fit in the recess by contact with the threads of the threaded shaft, the molded part has a projecting shoulder extending in a circumferential direction with a first surface pointing toward the threaded nut and a second, oppositely arranged surface pointing toward the threaded shaft.

2. The ball screw according to claim 1, wherein the molded part has a section with an opposite construction with respect to a threaded profile of the threaded shaft.

3. The ball screw according to claim 1, wherein the projecting shoulder that extends in the circumferential direction has a circular segment shape.

4. The ball screw according to claim 1, wherein the molded part is an injection molded, die cast, or sintered part.

5. The ball screw according to claim 1, wherein the molded part is a machined part.

6. The ball screw according to claim 1, wherein said shoulder engages in a ring gap defined by the threaded nut and the threaded shaft.

* * * * *